(12) United States Patent
Miettinen

(10) Patent No.: US 6,977,449 B2
(45) Date of Patent: Dec. 20, 2005

(54) FREQUENCY CONVERTER AND DRIVE FOR ELECTRIC MOTOR

(75) Inventor: Erkki Miettinen, Helsinki (FI)

(73) Assignee: ABB Oy, Helsinki (FI)

( * ) Notice: Subject to any disclaimer, the term of this patent is extended or adjusted under 35 U.S.C. 154(b) by 10 days.

(21) Appl. No.: 10/880,373

(22) Filed: Jun. 30, 2004

(65) Prior Publication Data

US 2005/0018459 A1    Jan. 27, 2005

(30) Foreign Application Priority Data

Jul. 4, 2003    (FI)    .................................. 20031022

(51) Int. Cl.[7] .............................................. H02J 7/00
(52) U.S. Cl. ......................................... 307/73; 307/66
(58) Field of Search ............................. 307/73, 72, 66, 307/67; 363/35

(56) References Cited

U.S. PATENT DOCUMENTS

| | | | |
|---|---|---|---|
| 4,160,996 A * | 7/1979 | Nigra et al. ................... | 307/75 |
| 6,101,113 A | 8/2000 | Paice | |

| | | | |
|---|---|---|---|
| 2002/0015320 A1 | 2/2002 | Mochikawa et al. | |
| 2002/0190697 A1 | 12/2002 | Ferens et al. | |

FOREIGN PATENT DOCUMENTS

| | | |
|---|---|---|
| DE | 19508348 | 9/1996 |
| DE | 19710371 | 9/1998 |

* cited by examiner

Primary Examiner—Shawn Riley
(74) Attorney, Agent, or Firm—Dykema Gossett PLLC

(57) ABSTRACT

A charging contactor and charging resistor of a capacitor battery in a prior art intermediate circuit of a frequency converter are replaced with three semiconductor switches connected between a three-phase voltage supply and a capacitor battery. When the frequency converter is connected to a supply network, the three semiconductor switches are arranged to operate at first in a current regulating mode in order to charge the capacitor battery using a regulated charging current until the voltage of the capacitor battery reaches a predetermined level. After this, the three semiconductor switches are directed to operate in a diode bridge mode in parallel with an actual network inverter, thus providing a second rectification branch. In a preferred embodiment of the invention, each semiconductor switch comprises a diode and a series connection of a gate-triggered component, preferably a thyristor.

13 Claims, 4 Drawing Sheets

FREQUENCY CONVERTER AND DRIVE FOR ELECTRIC MOTOR

BACKGROUND OF THE INVENTION

The invention relates to frequency converters and to electric drives.

An electric motor drive, i.e. electric drive, is an energy converter provided between a supply network and a process for converting, by means of a machine driven by an electric motor, the energy of the network for use by the process. Frequency-controlled cage induction motor drives often employ frequency converters provided with an intermediate circuit. In accordance with FIG. 1, a typical frequency converter provided with an intermediate circuit comprises a rectifier 10 that supplies a pulsating direct voltage to the capacitor battery of a direct voltage intermediate circuit 11 for generating direct voltage in the intermediate circuit. The last component is an inverter 12, whose controllable switch components are used to re-modify the direct voltage of the capacitors of the intermediate circuit 11 into an alternating voltage of the desired frequency. In addition, the frequency converter usually includes a control unit 13 for attending to the appropriate operation of the frequency converter. The amplitude of the output voltage of the frequency converter is typically adjusted by changing the pulse pattern of the output voltage by pulse width modulation, for example.

Many drives always rotate in the same direction and the load never has to be braked. In other words, the power flows from the supply network through the rectifier, the intermediate circuit and the inverter to the motor. However, the power (e.g. braking energy) cannot flow through a conventional rectifier 10 from the motor to the supply network. A four-quadrant drive is an electric drive, wherein the power can flow freely from an alternating current supply network to a load and from the load back to the supply network. At the supply network side, the four-quadrant drive also comprises an inverter supply unit 12 implemented with switch components. The switch elements, or choppers, are gate-controlled power transistors (IGBT); fast, so-called freewheeling diodes being connected between the collector and emitter of the transistors. Other examples of switch components include MOSFET and bipolar transistors. The diodes of the inverter supply unit 12 are usually employed also for rectification when power flows from the supply network towards the load. Since the diodes immediately become conductive when a forward bias voltage is provided across them, the four-quadrant drive cannot be connected to the supply network without auxiliary devices with which the intermediate circuit capacitor battery 11 is first charged to the level required by the mains voltage. For this purpose, separate main and charging contactors and one or more current-limiting charging resistors are usually employed.

FIG. 2 shows an example of a four-quadrant drive comprising a circuit for charging the intermediate circuit capacitor battery. Switch module SM1 corresponds to the rectifier 10, and switch module SM2 corresponds to the inverter 12 in FIG. 1. In both switch modules, switch components SW1 to SW12 are for instance gate-controlled power transistors (IGBT); fast, so-called freewheeling diodes D1 to D12 being connected between their collector and emitter. The capacitor battery of the intermediate circuit comprises capacitors C1 and C2. Contactor K1 is the main contactor, dimensioned according to the nominal phase current, and contactor K2 is a charging contactor dimensioned according to the charging current. Resistor R1 is a charging resistor.

In FIG. 2, a star-connected secondary winding M1 of a transformer T1 presents a supply network, from which the intermediate circuit capacitor battery C1-C2 is charged by first closing the charging contactor K2. The capacitor battery C1-C2 is charged through a diode V1 and the current-limiting resistor R1, until control logics 20 of the contactors observe that the capacitor battery C1-C2 has reached a sufficiently high voltage level. This being so, the main contactor K1 is opened, the capacitor battery C1-C2 being charged to its final voltage through the diodes D1 to D6, connected as a three-phase bridge, of the switch module SM1. The charging contactor K2 can now be opened.

At the circuit diagram level, the method seems simple, but high-power contactors and charging resistors are bulky and outstandingly expensive components. In addition, the power required by the pull-through winding of a large contactor in operating the contactor may be hundreds, even thousands of volt-amperes, and the holding power dozens of watts. This requires an extremely effective power source, which is otherwise not necessarily required.

The rectification operation of the switch module SM1 shown in FIG. 2 is called six-pulse rectification, since the direct voltage of the intermediate circuit is composed of six pulses during a mains voltage cycle. It is evident that when a 12, 18 or 24-pulse rectification is desired, i.e. when the number of supply voltage phases is increased, the number of main contactors K1 has to be doubled, tripled or quadrupled.

The diode bridge/switch rectifier according to FIG. 2 is also generally employed not only when an actual four quadrant is required, but also for decreasing the large mains current distortion generated by six-pulse diode bridge rectification, although the power would not have to be fed back to the mains network. However, IGB transistors and fast diodes are quite expensive, and the power loss properties of a mains bridge implemented with fast diodes are not as good as those of a bridge implemented with slower, so-called mains diodes.

The distortion problem can be evaded by employing 12-pulse rectification using the circuit of FIG. 3, for example. In practice, the current tolerance of components is typically such that a rectifier formed of quite low-current and extremely inexpensive thyristor/diode modules 10A and 10B is adequate for supplying the most high-power switch module 12A and 12B implemented with IGB transistors in a low-voltage frequency converter. Even average-power (>200 kW) frequency converters require a parallel connection of two or more switch modules. In this case, it is preferable to supply a power for each switch module 12A or 12B with the dedicated rectifier 10A and 10B, which can be connected to a 6, 9 or even 12-phase mains supply (in FIG. 3, to the star-connected and delta-connected secondary windings M1 and M2), whereby the current distortion reflected to the primary winding (not shown) of the supplying transformer T1 is significantly reduced. In the assembly, a common intermediate circuit capacitor C is preferably employed. The rectifiers are controlled by thyristor control 30. The circuit of FIG. 3 achieves a significantly lower mains current distortion than a six-pulse diode bridge, but power cannot be transferred to supply the network. This is not even required in fan or pump drives. The motor may comprise either one or two windings.

BRIEF DESCRIPTION OF THE INVENTION

The object of the invention is thus to provide a solution for alleviating the problem associated with contactors.

This object is achieved with a frequency converter and an electric drive characterized in what is disclosed in the independent claims. Preferred embodiments of the invention are described in the dependent claims.

The invention is based on replacing the conventional charging contactor and charging resistor of a capacitor battery of an intermediate circuit with three semiconductor switches connected between the first, second and third phase, respectively, of a multiphase alternating current supply, and the capacitor battery. When the frequency converter is connected to a supply network, these three semiconductor switches are configured to first act in a regulating mode for charging the capacitor battery with a regulated charging current, until the voltage of the capacitor battery reaches a predetermined level. These three semiconductor switches are then controlled to operate in a diode bridge mode in parallel with a network inverter. In a preferred embodiment of the invention, each semiconductor switch comprises a series connection of a diode and a gate-triggered component, preferably a thyristor.

The semiconductor switches required in the invention are more inexpensive and less bulky than prior art charging contactors and charging resistors. Semiconductor switches are controllable to charge a capacitor battery in a controlled manner and to restrict the charging current within an allowed range, by the use of a phase control method, for example. When the charging has reached the desired level, and the alternating voltage supply is also connected to the network inverter, the semiconductor switches of the invention are controlled to operate as a diode bridge. This way the rectification occurs along two routes: conventionally, through the network inverter, and through the semiconductor switches according to the invention. This enables an increase in total power or a decrease in the power transferred through the network inverter. In practice, the voltage loss due to the latter route is smaller, allowing it to take a larger part of the total mains current. This is advantageous since the diodes of the network inverter are fast and their dropout voltage and, thereby, power loss, are greater than with thyristors, for example.

In an embodiment of the invention, at least six ac voltage phases are fed to the frequency converter, i.e. the above-mentioned two rectifier routes are connected to different phases of the voltage supply, whereby the frequency converter implements an at least 12-pulse rectification at the same time as power transfer from the load back to the network (four quadrant drive) is possible. This is a significant advantage over prior art circuits, wherein these two properties cannot be combined.

In the preferred embodiment of the invention, the main contactor is also replaced with semiconductor switches transferring power bidirectionally. This achieves not only space savings and cost savings, but also the advantage of avoiding the additional power or the extra power source required by the pull-through winding of a conventional main contactor.

Some embodiments of the invention comprise the features of the above-described embodiments in different combinations.

One feature of the invention is an electric drive comprising n frequency converters according to the invention in parallel such that each frequency converter is connected to a dedicated n-phase alternating voltage supply, wherein n=2, 3, 4, . . . . This enables simple implementation of 18-pulse or 24-pulse rectification, for example. This being so, the mains current distortion is inherently almost nonexistent.

BRIEF DESCRIPTION OF THE FIGURES

In the following, preferred embodiments of the invention will be described in detail with reference to the accompanying drawings, in which.

DETAILED DESCRIPTION OF THE INVENTION

Figure 4:
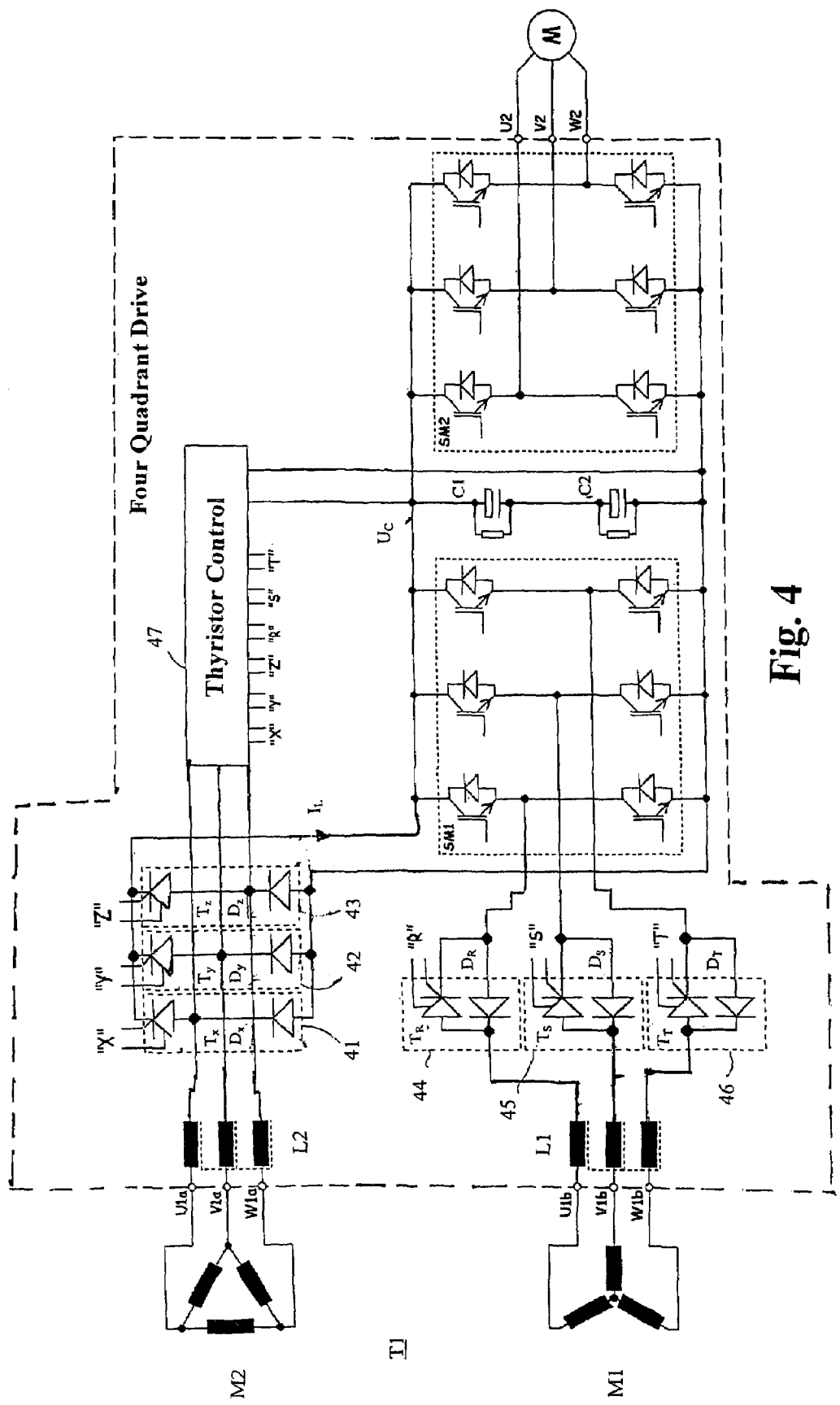
FIG. 4 shows a circuit diagram of the principle of an electric motor drive according to an embodiment of the invention.

In the four-quadrant drive shown as an example in FIG. 4, the conventional charging contactor and charging resistor of a capacitor battery C1-C2 of an intermediate circuit are replaced with three semiconductor switches 41, 42 and 43. Each semiconductor switch 41, 42 and 43 comprises a diode $D_x$, $D_y$ or $D_z$, respectively, and a series connection of a gate-triggered component (in the exemplary circuit, a thyristor) $T_x$, $T_y$ or $T_z$, respectively, which is connected in parallel with the capacitor battery C1-C2. The interconnection node of the series connection is connected to the corresponding phase U1a, V1a or W1a of an alternating voltage input, which in the exemplary case is generated with a delta-connected secondary winding M2 of a transformer T1. Choke coils L2 may facilitate limiting the harmonics in the mains current and in preventing the passage of high interfering frequencies.

The conventional main contactor is replaced with semiconductor switches 44, 45 and 46 that transfer power bidirectionally and comprise an anti-parallel connection of a diode $D_R$, $D_S$ or $D_T$ and a gate-triggered component (in the exemplary circuit, a thyristor) $T_R$, $T_S$ or $T_T$, respectively. In other words, the anode of each thyristor $T_R$, $T_S$ and $T_T$ is connected to the corresponding phase U1b, V1b or W1b of the alternating voltage input, which in the exemplary case is generated with the star-connected secondary winding M1 of the transformer T1. Choke coils L1 may facilitate limiting the harmonics in the mains current and in preventing the passage of high interfering frequencies. The cathode of each thyristor $T_R$, $T_S$ and $T_T$ is connected to an inverter bridge SM1, i.e. to the corresponding intermediate nodes of the switch components of the inverter bridge. Each diode $D_R$, $D_S$ or $D_T$ is connected in parallel with the corresponding thyristor $T_R$, $T_S$ and $T_T$ such that the anode of the diode is connected to the cathode of the thyristor, and the cathode of the diode to the anode of the thyristor. Accordingly, when the thyristors $T_R$, $T_S$ and $T_T$ are triggered, the switch components 44, 45 and 46 conduct power in both directions.

From a thyristor control circuit 47, control signals X, Y and Z are connected to the gates of the thyristors $T_x$, $T_y$ and $T_z$, and control signals R, S and T to the gates of the thyristors $T_R$, $T_S$ and $T_T$. The thyristor control circuit 47 is also configured to observe the voltages of the intermediate nodes of the semiconductor switch components 41, 42 and 43 and the voltage of the capacitor battery C1-C2.

The manners of implementing the capacitor battery, the network inverter SM1 and the inverter SM2 are not essential, but they can be implemented using any suitable solution. In this context, the capacitor battery refers to a unit constituted by one or more capacitors C1, C2. Shunt resistors are preferably connected in parallel with the capacitors. The network inverter SM1 may be any switch bridge capable of bidirectional power transmission. Suitable switch module SM1 constructions are evident to a person skilled in the art. The exemplary construction of FIG. 4 is a prior art network inverter SM1, wherein IGB transistors are used. It enables further reduction of the mains distortion in a manner known per se. Similarly, the inverter SM2 can be implemented for instance by prior art solutions, one of which is illustrated in FIG. 4. The inverter SM2 generates alternating voltages U2, V2 and W2 at the desired frequency for the load, such as for an electric motor M. The inverters SM1 and SM2 are controlled in a manner known per se with control signals fed to the gates of the transistors.

The operation of the semiconductor switches according to this embodiment of the invention can be divided into two operational modes, i.e. a charging mode, wherein the semiconductor switches 41, 42 and 43 are controlled to charge the capacitor battery C1-C2 of the voltage intermediate circuit, and a diode mode, wherein the semiconductor switches 41, 42 and 43 are controlled to operate as a rectifier bridge and to feed full voltage to the capacitor batteries C1-C2 of the direct voltage intermediate circuit.

In the charging mode, the voltage of the direct voltage intermediate circuit is raised in a controlled manner to a target level. Typically, at the start of charging, the capacitor battery or the capacitor of the intermediate circuit is entirely or almost uncharged. The charging takes place for instance as follows: when the mains voltage is switched on, all thyristors $T_x$, $T_y$ and $T_z$, and $T_R$, $T_S$ and $T_T$ are uncontrolled (signals X, Y, Z, R, S and T are inactive), and thus the thyristors cannot be triggered. Accordingly, the semiconductor switches 44, 45 and 46 disconnect the supply network from the network inverter SM1. Consequently, current cannot flow in an uncontrolled manner through the diode bridge of the network inverter SM1 to the capacitor battery C1-C2. No current flows either through the semiconductor switches 41, 42 and 43 to the intermediate circuit. Not until the charging is to be initiated does the thyristor control 47 control the thyristors $T_x$, $T_y$ and $T_z$ by means of signals "X", "Y" and "Z" such that charging takes place in a controlled manner, and charging current $I_L$ is limited to the allowed value. In the preferred embodiment of the invention, this takes place by a phase angle control method, known per se. The speed of the charging of the capacitor C1-C2 can be adjusted for instance by controlling the triggering instant of the thyristors $T_x$, $T_y$ and $T_z$ as compared with a mains cycle. The thyristor can be triggered in a known manner when the anode voltage exceeds the cathode voltage. However, the thyristor cannot be actively turned off, but it turns off when the current flowing through the thyristor is below the holding current. This turn-off situation is called natural commutation. The thyristor control 47 is able to input short pulses to the gate of the thyristor $T_x$, $T_y$ and $T_z$ at such instants that the thyristor is triggered slightly before it is turned off by the action of natural line commutation. This results in a current pulse, cut from a mains cycle, passing into the capacitor battery C1-C2 of the direct voltage intermediate circuit and raises the terminal voltage of the battery. The amplitude of the current pulse depends on the inductance limiting the current and on how long before the commutation instant the gate pulse is given.

The thyristor control 47 observes the terminal voltage of the capacitor battery C1-C2. When the terminal voltage of the capacitor battery C has risen sufficiently high, the control assumes the diode mode. In the diode mode, the thyristor control 47 compares the instantaneous phase voltage U1a, V1a or W1a, i.e. $T_x$, $T_y$ and $T_z$ anode voltage, with the cathode voltage, i.e. the second terminal voltage $U_C$ of the capacitor battery C1-C2. The thyristor control 47 provides gate current to the thyristors $T_x$, $T_y$ and $T_z$ with signals "X", "Y" and "Z" always when the anodes of the thyristors are more positive than the cathodes. By the action of the gate current, the thyristor is immediately triggered when its anode voltage exceeds the cathode voltage. Accordingly, in accordance with the invention, gate current is generated until the instant when the anode voltage becomes more negative than the cathode voltage. As a consequence, the operation of the bridge constituted by the semiconductor switches 41, 42 and 43 resembles that of a diode bridge.

When the semiconductor switches 41, 42 and 43 are controlled into the diode mode, the thyristor control 47 simultaneously starts to feed a continuous direct gate current to the thyristors $T_R$, $T_S$ and $T_T$ with signals "R", "S" and "T", allowing the thyristors to be triggered always when the anode of the thyristor is more positive than the cathode. Anti-parallel connected thyristor pairs 44, 45 and 46 thus conduct in both directions, exactly similarly as does a closed contactor. As regards the leakage current losses of the thyristor, a continuous gate current is not harmful, since the reverse voltage of the thyristors $T_R$, $T_S$ and $T_T$ is limited to be equal to the diode voltage. Dc gate current can be provided for the thyristors $T_R$, $T_S$ and $T_T$ in three different phase potentials, preferably by means of a small pulse transformer and diode bridges or by 'stealing' from the gate controllers of the upper IGB transistors of the switch module SM1.

The inverters SM1 and SM2 may operate in accordance with prior art solutions.

Rectification thus occurs along two routes: through the diode bridge constituted by the semiconductor switches 41, 42 and 43 and through the diode/thyristor switches 44, 45 and 46 and the diode bridge of the inverter SM1. If six input phases are in use in accordance with FIG. 4, a 12-pulse rectification is achieved, and along with it, naturally, a small mains current distortion. The distortion can be further reduced by using the IGB transistors of the network inverter SM1 in a known manner. Since the voltage loss of the former route is smaller, it takes a slightly larger part of the total mains current. If desired, the phenomenon can be compensated for e.g. by increasing the inductance of the choke of the first route suitably, or by arranging the inductances of the secondary windings of the input transformer to differ from each other.

In an electric motor drive according to an embodiment of the invention, n frequency converters according to the invention are connected in parallel such that each frequency converter is connected to a dedicated 6-phase alternating voltage input, wherein n=2, 3, 4, . . . .

Connection a plurality of such converters in parallel enables the implementation of 18 or 24-pulse rectification. In these cases, the mains current distortion is already inherently almost nonexistent, and thus the switch module only 'finishes' the rectification. The parallel connection can be implemented for instance by using a special-connected input transformer, which outputs the required number of three-phase outputs. In a 24-pulse converter system, four secondary windings are thus required (i.e. two additional windings in addition to windings M1 and M2 of FIG. 4), whose phase difference is 15 degrees (360 degrees/24). The switch bridge 41, 42 and 43 is connected to one of the secondary windings (e.g. winding M2 in accordance with FIG. 4). A network inverter is connected to each of the other secondary windings in the same way as the network converter SM1 is connected through the switches 44, 45 and 46 to the secondary winding M1. Accordingly, the network converter branch of FIG. 4 is replicated into three parallel branches, each having a dedicated three-phase input. All branches feed the same capacitor battery. The inverter controlling the motor can be for instance similar to the inverter SM2 of FIG. 4.

Figure 1:
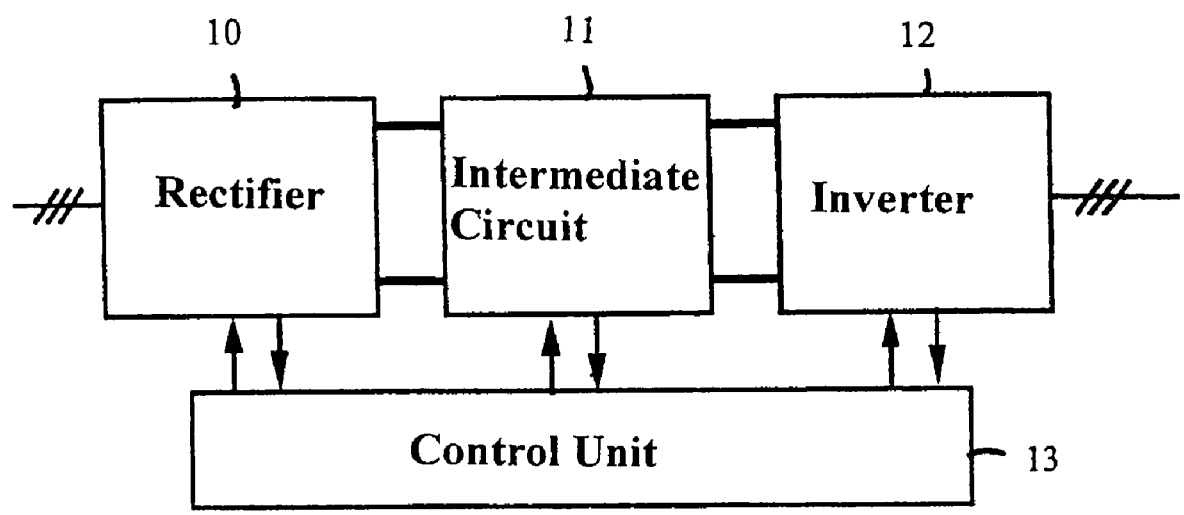
FIG. 1 is a block diagram illustrating the construction of a frequency converter or electric drive provided with an intermediate circuit.
Figure 2:
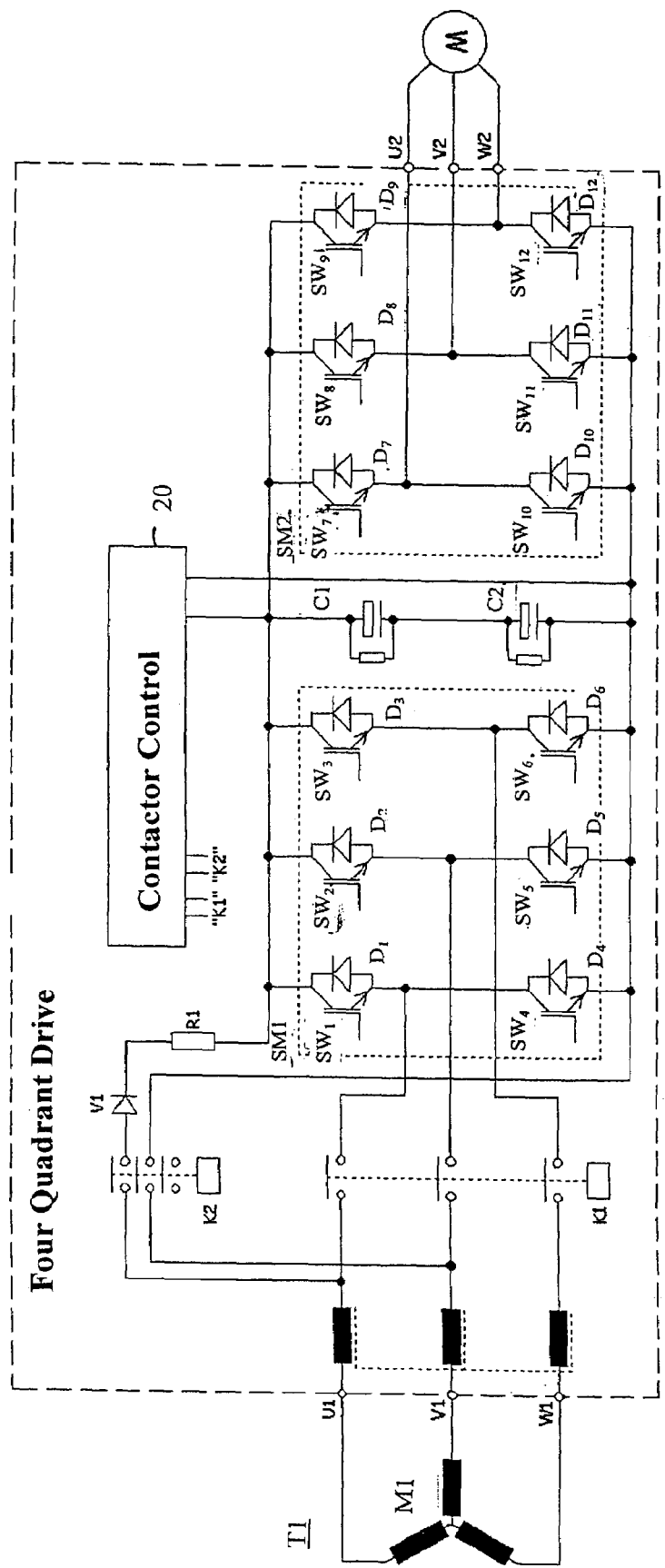
FIG. 2 shows a circuit diagram of the principle of a prior art four-quadrant drive.
Figure 3:
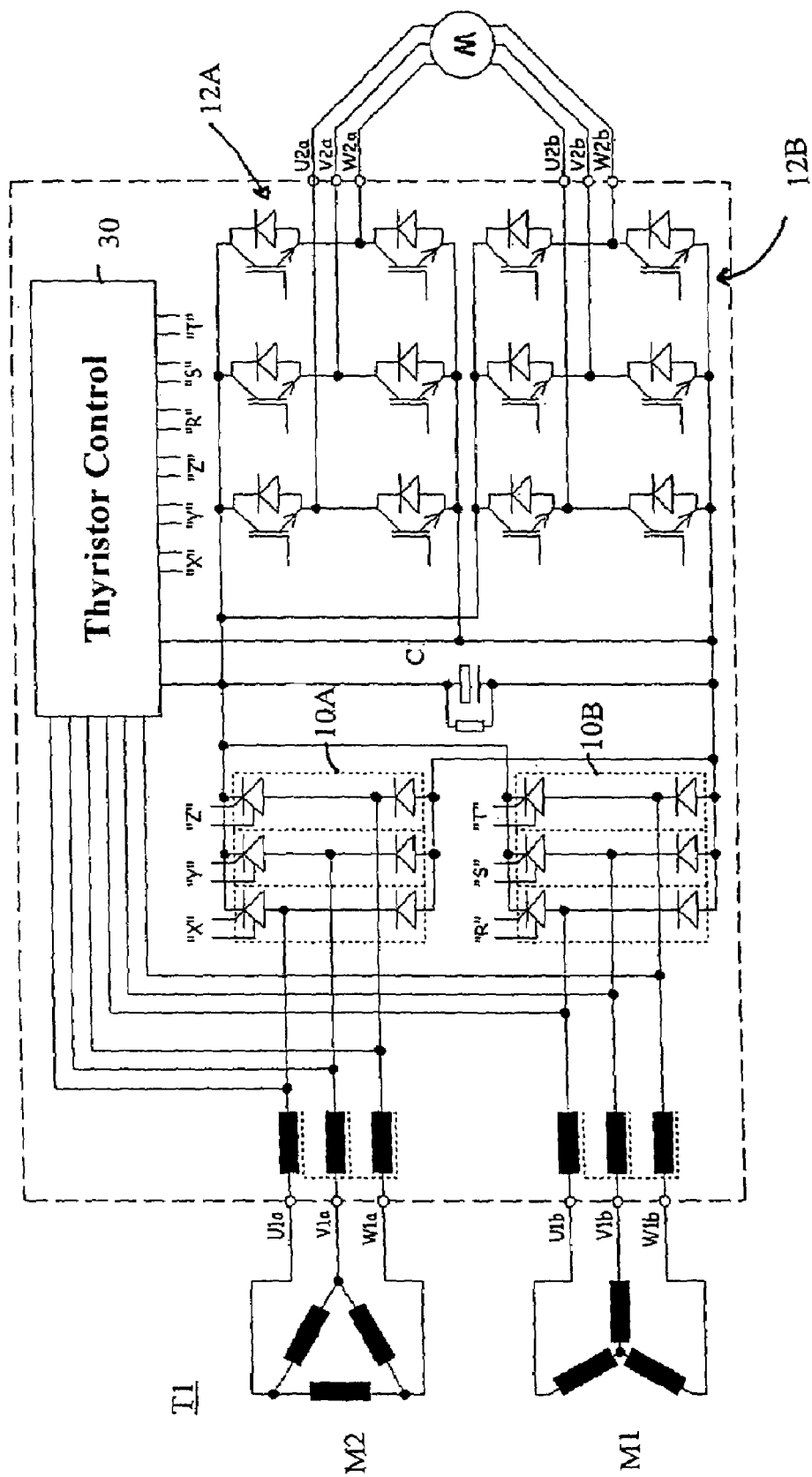
FIG. 3 shows a circuit diagram of the principle of a prior art two-quadrant drive.

One practical additional advantage of the invention is that only one mechanical solution is required in the manufacture of electric drives for implementing both the two-quadrant drive of the type of FIG. 3 and the four-quadrant drive of the type of FIG. 4. This is because the same components can be used therein, only in a slightly different manner.

It is obvious to a person skilled in the art that as technology advances, the basic idea of the invention can be implemented in a variety of ways. The invention and its embodiments are thus not limited to the above examples, but may vary within the spirit and scope of the claims.

What is claimed is:

1. A frequency converter, comprising
   a network inverter to be connected to a multiphase alternating voltage supply,
   a capacitor battery of a direct voltage intermediate circuit,
   a second inverter to be connected to a load,
   a switch means that transfers power bidirectionally and is connected between the multiphase alternating-voltage supply and the network inverter and configured to disconnect the power supply from the network inverter until the voltage of the capacitor battery reaches a predetermined level,
   a first, second and third semiconductor switch connected to between a first, second and third phase, respectively, of the multiphase alternating voltage supply and said capacitor battery and configured to first operate in a current regulating mode for charging the capacitor battery with regulated charging current until the voltage of the capacitor battery reaches a predetermined level, and to operate then in a diode bridge mode in parallel with the network inverter.

2. A frequency converter as claimed in claim 1, wherein each of the first, second and third semiconductor switches comprises a series connection of a diode and a gate-triggered component, preferably a thyristor, connected in parallel with the capacitor battery and having an intermediate node connected to the corresponding phase of the alternating voltage supply.

3. A frequency converter as claimed in claim 1, wherein each of the first, second and third semiconductor switches comprises a series connection of the diode and the thyristor and constitute a diode/thyristor bridge, and
   the frequency converter comprises control means, which in the current regulating mode control the thyristors to regulate the charging current until the voltage of the capacitor reaches a predetermined level, and which then control the thyristors to operate as rectifier diodes such that the diode/thyristor bridge acts as a diode rectification bridge.

4. A frequency converter as claimed in claim 2, wherein the timing of the triggering pulses of the gate-triggered components in the current regulating mode is adjustable relative to a mains cycle of a corresponding input voltage phase.

5. A frequency converter as claimed in claim 1, wherein said switching means that transfers power bidirectionally comprises a fourth, fifth and sixth phase-specific semiconductor switch that transfers power bidirectionally.

6. A frequency converter as claimed in claim 5, wherein each of the fourth, fifth and sixth semiconductor switch comprises a diode and a gate-triggered component, preferably a thyristor, in anti-parallel connection between the corresponding supply voltage phase and the network inverter, the diode being configured to transfer power from the network inverter towards the alternating voltage supply, and the gate-triggered component is configured to transfer power in a conductive state from the alternating voltage supply towards the network inverter, and in a non-conductive state to break the power transfer in said direction.

7. A frequency converter as claimed in claim 1, wherein the switch means transferring power bidirectionally and the first, second and third semiconductor switch are connected in parallel to the same three-phase alternating voltage supply, and wherein the network inverter and the first, second and third semiconductor switch accomplish a 6-pulse rectification.

8. A frequency converter as claimed in claim 1, wherein the switch means transferring power bidirectionally and the first, second and third semiconductor switch are connected to the different phases of a six-phase alternating voltage supply, and wherein the network inverter and the first, second and third semiconductor switch accomplish a 12-pulse rectification.

9. A frequency converter as claimed in claim 1, wherein the frequency converter comprises, in parallel with said network inverter, at least one additional frequency converter connected through a corresponding switch means transferring power bidirectionally to a dedicated three-phase supply and configured to feed said capacitor battery, and wherein the network inverter, said at least one additional network inverter, and the first, second and third semiconductor switch accomplish an at least 18-pulse rectification.

10. A frequency converter as claimed in claim 1, wherein the capacitor battery comprises one or more capacitors.

11. A frequency converter as claimed in claim 1, wherein said multiphase alternating voltage supply is accomplished with a transformer in which secondary windings are connected to produce three-phase supplies that are mutually in phase shift.

12. An electric motor drive comprising a frequency converter, said frequency converter further comprising
   a network inverter to be connected to a multiphase alternating voltage supply,
   a capacitor battery of a direct voltage intermediate circuit,
   a second inverter to be connected to a load,
   a switch means that transfers power bidirectionally and is connected between the multiphase alternating-voltage supply and the network inverter and configured to disconnect the power supply from the network inverter until the voltage of the capacitor battery reaches a predetermined level,
   a first, second and third semiconductor switch connected to between a first, second and third phase, respectively, of the multiphase alternating voltage supply and said capacitor battery and configured to first operate in a current regulating mode for charging the capacitor battery with regulated charging current until the voltage of the capacitor battery reaches a predetermined level, and to operate then in a diode bridge mode in parallel with the network inverter.

13. An electric motor drive comprising n frequency converters in parallel such that each frequency converter is connected to a dedicated 6-phase alternating voltage supply, wherein n=2, 3, 4, . . . , each said frequency converter further comprising
- a network inverter to be connected to a multiphase alternating voltage supply,
- a capacitor battery of a direct voltage intermediate circuit,
- a second inverter to be connected to a load,
- a switch means that transfers power bidirectionally and is connected between the multiphase alternating-voltage supply and the network inverter and configured to disconnect the power supply from the network inverter until the voltage of the capacitor battery reaches a predetermined level,
- a first, second and third semiconductor switch connected to between a first, second and third phase, respectively, of the multiphase alternating voltage supply and said capacitor battery and configured to first operate in a current regulating mode for charging the capacitor battery with regulated charging current until the voltage of the capacitor battery reaches a predetermined level, and to operate then in a diode bridge mode in parallel with the network inverter.

* * * * *